United States Patent [19]
Peled et al.

[11] Patent Number: 6,076,144
[45] Date of Patent: Jun. 13, 2000

[54] METHOD AND APPARATUS FOR IDENTIFYING POTENTIAL ENTRY POINTS INTO TRACE SEGMENTS

[75] Inventors: Guy Peled, Yokneam; Robert C. Valentine, Tivon; Oded Lempel, Haifa, all of Israel

[73] Assignee: Intel Corporation, Santa Clara, Calif.

[21] Appl. No.: 08/982,083

[22] Filed: Dec. 1, 1997

[51] Int. Cl.[7] ............................................. G06F 12/08
[52] U.S. Cl. ................................. 711/125; 712/238
[58] Field of Search ................................... 711/118, 125; 712/24, 204, 205, 206, 233, 238, 239

[56] References Cited

U.S. PATENT DOCUMENTS 5,381,533  1/1995  Peleg et al. .............................. 395/375
5,790,822  8/1998  Sheaffer et al. .

OTHER PUBLICATIONS

Intrater et al., "Performance Evaluation of a Decoded Instruction Cache for Variable Instruction–Length Computers," 1992, p 106–113, ACM.

Rotenberg et al., "Trace Cache: a Low Latency Approach to High Bandwidth Instruction Fetching," 1996, p 24–34, IEEE.

*Primary Examiner*—Eddie P. Chan
*Assistant Examiner*—Kevin L. Ellis
*Attorney, Agent, or Firm*—Blakely, Sokoloff, Taylor & Zafman LLP

[57] ABSTRACT

An apparatus includes a data array, control logic, an entry candidate table, and a future target table. The control logic is coupled to the data array and adapted to store at least one trace segment of instructions into the data array. The entry candidate table is coupled to the control logic and is adapted to store offset information related to the position of a selected instruction within the trace segment. The future target table is coupled to the control logic and adapted to store a potential entry point into the trace segment. A method for caching instructions includes storing a first plurality of instructions in a first trace segment. A control flow instruction is identified from the first plurality of instructions and the outcome of the control flow instruction is predicted. The control flow instruction has a predicted taken target address and a predicted not-taken target address corresponding to the outcome predicted. The predicted not-taken target address is stored.

29 Claims, 7 Drawing Sheets

| Valid 420 | LA 415 | Head 405 | Tail 410 | Next Way 425 | Prev. Way 430 | ... | uIP 435 | NLIP 440 | uIP Valid 445 | ECT Pointer 447 |

FIGURE 4B (450)

| ECTLIP 455 | Head Seg. LA 460 | TC Pointer 465 | Valid 470 |

FIGURE 4C (475)

| FTTLIP 480 | Valid 485 |

FIGURE 5 (500)

| uOP0 510 | uOP1 510 | uOP2 510 | uOP3 510 | uOP4 510 | uOP5 510 | ... |

FIGURE 6 (510)

| uOP Valid 610 | ΔIP 660 | ΔIP Valid 670 | Branch Target 680 | FOP Code 690 | SRC 0 620 | SRC 1 630 | Dest. 640 | uOP Code 640 |

METHOD AND APPARATUS FOR IDENTIFYING POTENTIAL ENTRY POINTS INTO TRACE SEGMENTS

BACKGROUND OF THE INVENTION

1. Field of the Invention

The present invention relates to the field of computer systems. More specifically, the present invention relates to the art of caching decoded micro-operations with trace segments having multiple entry points.

2. Description of Related Art

Historically, cache instruction are stored and organized in an instruction cache in accordance with the instructions' memory addresses. Each cache line stores a number of instructions that are spatially adjacent to each other in main memory. This historic approach to caching instructions has at least one disadvantage in that it typically requires multiple cache lines to be accessed whenever execution of a program necessitates branching from the middle of a cache line or branching into the middle of a cache line.

An alternative approach to organizing cached instructions is known, whereby cached instructions are organized by instruction trace segments. Each cache line stores an instruction trace segment comprising one or more basic blocks of instructions that are predicted to be sequentially executed. For example, in an embodiment where each cache line comprises two basic blocks of instructions, the second basic block of instructions includes instructions to be executed if the branch instruction located at the end of the first basic block is taken. Assuming the branch is predicted taken, the second basic block is placed in the same cache line.

Additionally, each cache line also includes the information necessary to continue fetching instructions upon reaching the end of the last basic block in the cache line, or in the event that the branch instruction at the end of a basic block earlier in the cache line is not taken as predicted. Each instruction trace segment is accessible only through the first instruction of the first basic block in a cache line. Thus, to facilitate direct fetching of any basic blocks within a cache line, these basic blocks are also cached in other cache lines as the first basic block. In other words, each basic block is cached twice.

A number of modem microprocessors employ micro-architectures to implement complex instruction set architectures, e.g., the Pentium® Pro processor, produced by Intel Corp., of Santa Clara, Calif. Each macro-instruction of a complex instruction set is implemented by way of multiple micro-instructions or micro-ops. Double caching is undesirable for caching micro-ops. Therefore, the historical spatial organization is typically employed for caching instructions.

For example, assume basic blocks A, B, C, and D represent code segments of an executing program. At one point in time block A is executed, followed by blocks C and D. Accordingly a trace segment ACD will be built. At a later time, block B is executed, followed by blocks C and D, which results in trace segment BCD being built. Because trace segment ACD can only be accessed through the first instruction of block A, the trace cache ignores the presence of blocks C and D and builds the new trace segment containing redundant code.

Thus, it is desirable to have a new approach for caching decoded micro-ops that allows trace segments to be entered from multiple entry points, thus reducing the degree of code redundancy present in the cache.

SUMMARY OF THE INVENTION

An aspect of the invention is seen in an apparatus including a data array, control logic, an entry candidate table, and a future target table. The control logic is coupled to the data array and adapted to store at least one trace segment of instructions into the data array. The entry candidate table is coupled to the control logic and is adapted to store offset information related to the position of a selected instruction within the trace segment. The future target table is coupled to the control logic and adapted to store a potential entry point into the trace segment.

Another aspect of the invention is seen in a method for caching instructions. The method includes storing a first plurality of instructions in a first trace segment. A control flow instruction is identified from the first plurality of instructions and the outcome of the control flow instruction is predicted. The control flow instruction has a predicted taken target address and a predicted not-taken target address corresponding to the outcome predicted. The predicted not-taken target address is stored.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The following examples are included to demonstrate preferred embodiments of the invention. It should be appreciated by those skilled in the art that the techniques disclosed in the examples that follow represent techniques discovered by the inventor to function well in the practice of the invention. However, those skilled in the art should, in light of the present disclosure, appreciate that many changes can be made in the specific embodiments disclosed herein without departing from the spirit and scope of the invention.

Figure 1:
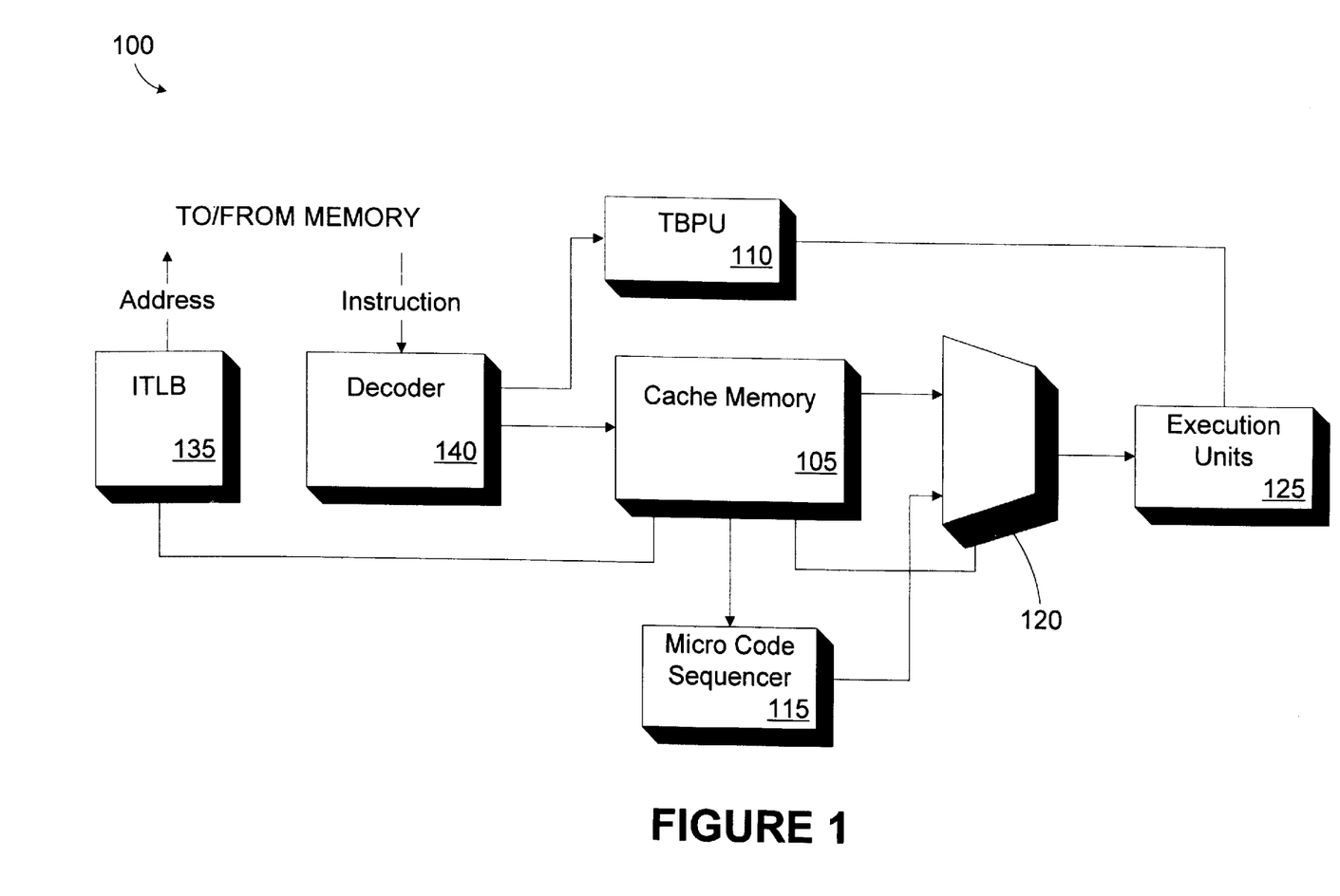
FIG. 1 is a block diagram of a processor core including a cache memory suitable for practicing the invention.

Referring first to FIG. 1, one embodiment of a computer system 100 suitable for practicing the present invention is illustrated. As shown, the computer system 100 includes a cache memory 105. The computer system 100 includes a trace branch prediction unit (TBPU) 110 (which includes branch target address calculation circuitry as well as next IP calculation circuitry), microcode sequencer 115, multiplexer 120, execution units 125, instruction translation look-aside buffer (ITLB) 135, and decoder 140.

The structure and operation of the cache memory 105 is described in greater detail below in reference to FIG. 2. The other elements 110–140 are intended to represent a broad category of these elements found in the art. In one embodiment, the elements are disposed in the same processor integrated circuit (chip).

Figure 2:
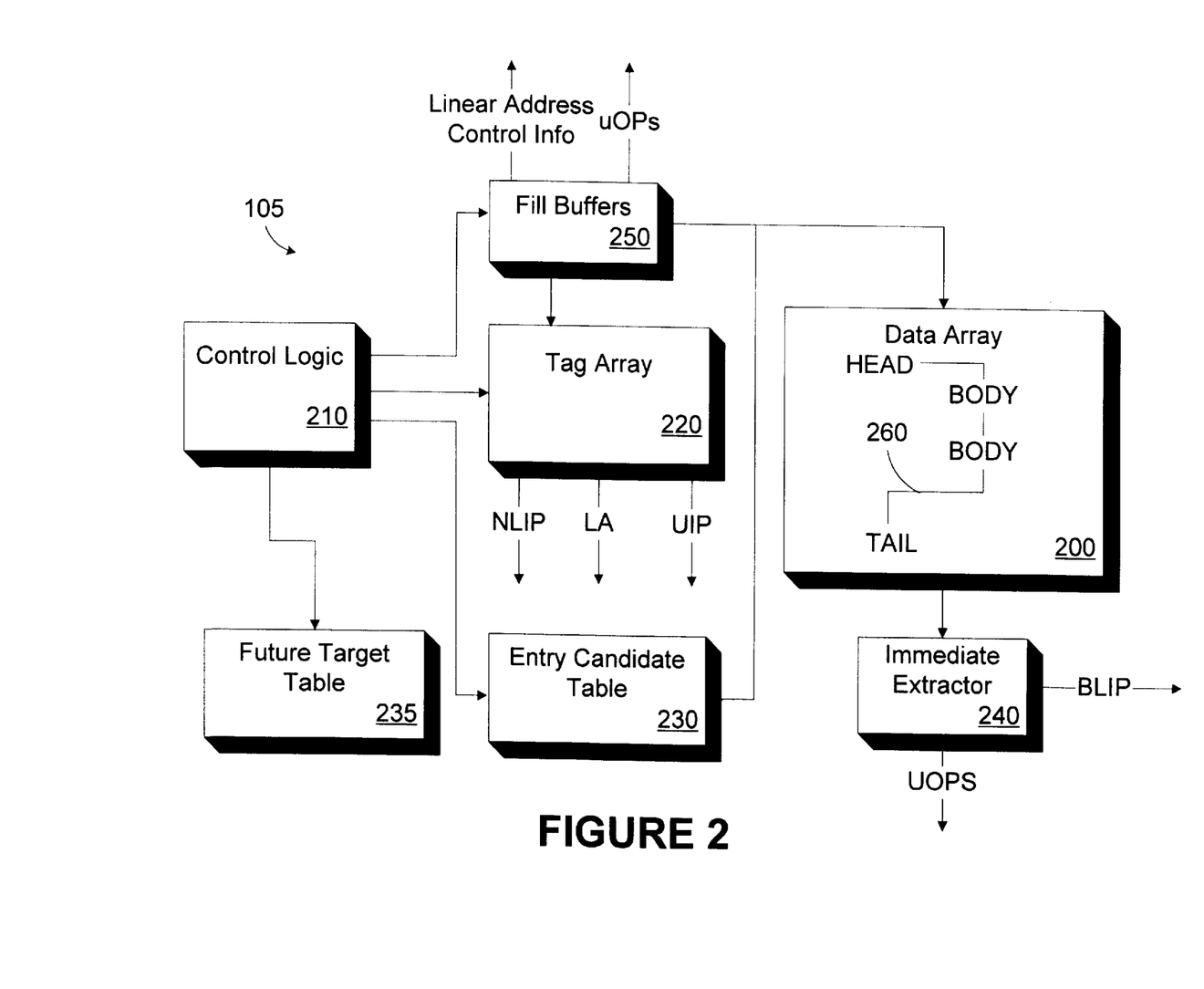
FIG. 2 is a block diagram illustrating one embodiment of the cache memory of FIG. 1.

Referring now to FIG. 2, a block diagram illustrating one embodiment of the cache memory 105 of the present invention is shown. As illustrated, the cache memory 105 includes a data array 200 and control logic 210, coupled to each other as shown. For the illustrated embodiment, the cache memory 105 further comprises a tag array 220, an entry candidate table 230, a future target table 235, an immediate extractor 240, and fill buffers 250, coupled to each other and to the above enumerated elements as shown.

As in conventional cache memories, the data array 200 comprises a plurality of data lines (shown in FIG. 4A), and the tag array 220 comprises a plurality of tag entries (shown in FIG. 5) corresponding to the data lines. The combination of the data lines and tag entries form cache lines of the cache memory 105. However, unlike conventional cache memories, the control logic 210 operates the cache memory 105 to cache decoded micro-ops in the data array 200, organizing the cached micro-ops by trace segments, e.g., 260, including trace segments that span multiple data lines. Each trace segment 260 includes one or more trace segment members of one or more instructions, with each trace segment member occupying one data line, and the data lines of a multi-line trace segment being sequentially associated (logically). Retrieval of the trace segment members of a multi-line trace segment is accomplished by first locating the data line storing the first trace segment member of the multi-line trace segment, and then successively locating the remaining data lines storing the remaining trace segment members based on the data lines' logical associations as described in more detail below. Although the specification describes caching micro-ops of macro instructions, the invention is not so limited. The invention may be applied to caching any type of instructions, with a micro-op being an illustrative example of one such instruction type.

Those skilled in the art will also appreciate that by trace caching instructions or decoded micro-ops in this manner, i.e., allowing a trace segment to span multiple data lines, the amount of instructions that can be supplied to the execution units of a processor will be larger than the rate that can be sustained by the prior art approaches. Furthermore, by virtue of allowing multi-data line trace caching, the size of the program loops that will be automatically unrolled will be larger, effectively eliminating the need for a compiler to perform loop unrolling optimization to "maximize" exploitation of processor performance. As a result, the generated code of programs will be more compact, which in turn will lead to memory space and instruction fetch time savings.

Information stored in the entry candidate table (ECT) 230 and the future target is table (FTT) 235 allows the trace segments 260 to be accessed through multiple entry points. As described in greater detail below, entries in the ECT 230 and FTT 235 identify predicted path and not-predicted paths of control flow instructions within a selected trace segment 260 to allow the trace segment 260 to be accessed from one of these addresses. The ECT 230 is populated while a trace segment 260 is being built by storing entry points in the predicted direction of the trace segment 260. The FTT 235 stores addresses in the not-predicted direction for possible future allocation into the ECT 230.

Figure 3:
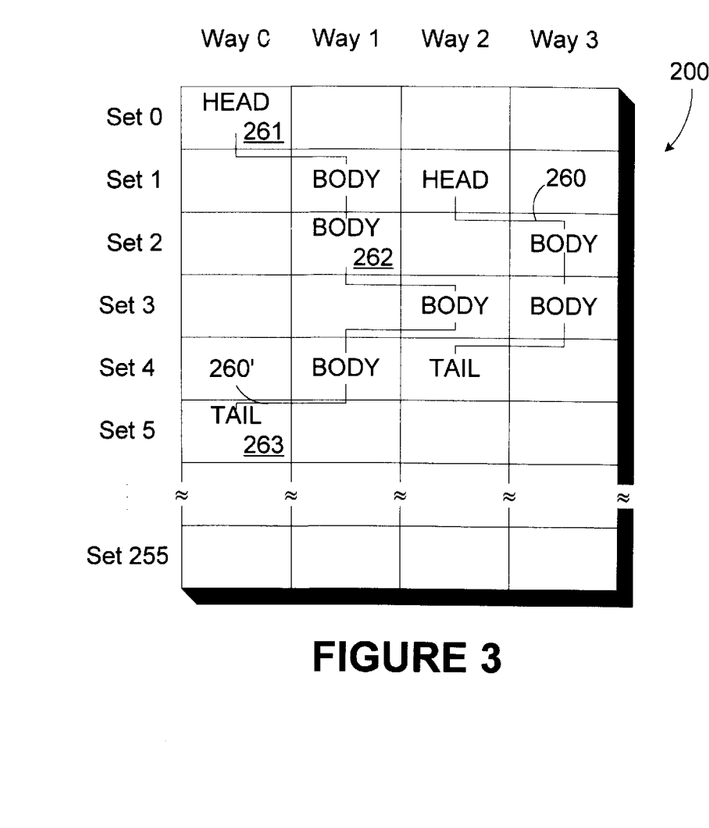
FIG. 3 is a block diagram illustrating the manner in which cached instructions are organized in the cache data array in accordance with the present invention.

FIG. 3 illustrates two trace segments, 260 and 260' of the present invention in further detail. In the illustrated embodiment, the data array 200 is a 4-way, 256-set embodiment. Based on the descriptions to follow, those skilled in the art will appreciate that other sizes of set associative cache, as well as other non-set associative organizations may be employed to practice the present invention. For ease of illustration, the first trace segment member of a trace segment (e.g., trace segment 260') is referred to as a trace segment head 261. The intermediate trace segment members are referred to as trace segment bodies 262, and the last trace segment member of a trace segment 260' is referred to as a trace segment tail 263. In the degenerate case of a two-member trace segment, the second trace segment member is a trace segment body 262 as well as a trace segment tail 263, and in the degenerate case of a single member trace segment, the singular trace segment member is a trace segment head 261, a trace segment body 262, as well as a trace segment tail 263. Micro-ops of each trace segment are accessed by way of the memory address of the first micro-op of the trace segment head 261 as defined by information contained within the tag array 220. Alternatively, micro-ops of a trace segment may be accessed from an intermediate point within the trace segment based on information contained within the entry candidate table 230.

For the illustrated embodiment, a location address is maintained for each data line storing the first trace segment member of a trace segment. The data line storing the first trace segment member of a trace segment is located by address-matching an access address against the location addresses maintained. Furthermore, the address-matching is performed using a subset of the address bits, and a matching data line is validated as to whether the data line indeed contains the first trace segment member being sought. Additionally, storing of trace segment members is further qualified with a criteria of ensuring the address-matching subset of the location addresses maintained in association with the various ways of a data line set, if any, is unique.

In an alternate embodiment, other trace segment members are also associated with memory addresses. In yet another alternate embodiment, address-matching is performed using all address bits.

For the illustrated embodiment, partial control information sequentially associating each data line storing a trace segment body or tail with its predecessor data line in a logical manner is maintained. Similarly, partial control information sequentially associating each data line storing a trace segment head or body with its successor data line in a logical manner is also maintained. The successive data lines of a multi-line trace segment are located, relying in part on the partial sequential association control information maintained. More specifically, for each data line storing a trace segment body or tail, a way index indexing into a way of the set of the predecessor data line is maintained, and for each data line storing a trace segment head or body, a way index indexing into a way of the set of the successor data line is maintained. Additionally, a predetermined set relationship between the successive data lines of a multi-line segment is maintained.

For the illustrated embodiment, a number of data line terminating conditions are employed to terminate caching of micro-ops of the trace segment 260 in one data line, and continue caching of the micro-ops of the trace segment 260 in another data line. Furthermore, a number of trace segment terminating conditions are also employed to terminate caching of micro-ops as one trace segment 260, and continue caching of instructions as a new trace segment (e.g., 260').

For the illustrated embodiment, the data line terminating conditions include the encountering of a complex macro-instruction that decodes into a large number of micro-ops. Only a predetermined number of micro-ops of the encountered complex macro-instruction are stored in the current data line, and the micro-ops of the next macro-instruction will be cached in a new data line. The determination of what constitutes a complex macro-instruction is application specific. It will be appreciated by those skilled in the art that the present invention may be practiced with none or all of the decoded micro-ops of a complex macro-instruction being cached.

For the illustrated embodiment, the data line terminating conditions further include the encountering of a branch micro-op after a predetermined threshold of maximum allowable branch micro-ops per trace segment has been reached. The branch micro-op will be cached in a new data line. In one embodiment, the predetermined threshold is two. However, it will be appreciated by those skilled in the art that the present invention may be practiced with or without a predetermined threshold for maximum allowable branch micro-ops per trace segment, and if one is employed, the threshold may be less than or greater than two.

For the illustrated embodiment, the data line terminating conditions further include the condition of not having enough room for all the micro-ops of a new macro-instruction. The micro-ops of the new macro-instruction will be cached in a new data line. In other words, for the illustrated embodiment, all micro-ops of a macro-instruction are cached in the same data line. However, it will be appreciated by those skilled in the art that the present invention may be practiced with micro-ops of a macro-instruction cached in more than one data line.

For the illustrated embodiment, the data line terminating conditions further include the condition of the fill buffers 250 being full. However, it will be appreciated by those skilled in the art that the present invention may be practiced with a data line taking multiple fills from a fill buffer.

For the illustrated embodiment, the trace segment terminating conditions include the encountering of an indirect branch macro-instruction, a call, or a return. However, it will be appreciated by those skilled in the art, that with additional tracking, the present invention may be practiced with each trace segment 260 having more than one indirect branch macro-instruction, call, and/or return.

For the illustrated embodiment, the trace segment terminating conditions further include the encountering of a branch misprediction notification, as well as an interrupt/exception.

For the illustrated embodiment, the trace segment terminating conditions further include the encountering of a long running trace segment 260 having a number of micro-ops that exceeds a predetermined maximum allowable trace segment length in terms of number of micro-ops per trace segment. In one embodiment, the predetermined maximum is 64 sets. However it will be appreciated by those skilled in the art that the present invention may be practiced with or without a predetermined maximum, and if one is employed, the maximum value may be lesser than or greater than 64 sets.

For the illustrated embodiment, the trace segment terminating conditions include determining that an entry in the ECT 230 corresponds to the linear address of the micro-op (uOP) being added to the trace. If a corresponding entry in the ECT 230 already exists, then an entry point into a different trace segment containing the desired uOPs is already present in the cache memory 105. Accordingly, the trace segment would be terminated to reduce code redundancy.

Figure 4A:
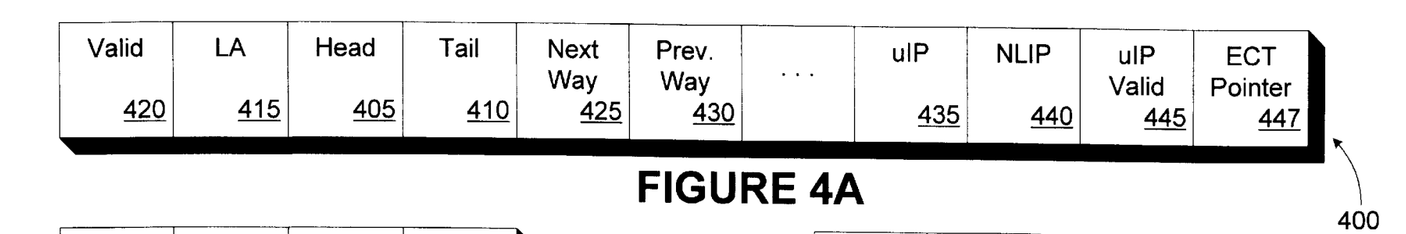
FIGS. 4A, 4B, 4C, 5, and 6 illustrate the content of a cache tag entry, an entry candidate table entry, a future target table entry, a cache line, and a micro-op, respectively.

FIG. 4A illustrates in further detail one embodiment of a tag entry 400 in the tag array 220 in accordance with the present invention. For the illustrated embodiment, the tag entry 400 includes a head bit 405 and a tail bit 410 for denoting whether the corresponding data line is a trace segment head 261 and/or a trace segment tail 263. If neither of these bits is set, the corresponding data line is a trace segment body 262. If both bits are set, the corresponding data line is also a trace segment body 262, as well as the trace segment head 261 and tail 263, i.e., the singular-member degenerate case described earlier. For the illustrated embodiment, the tag entry 400 further includes linear address bits (LA) 415 for storing a linear address in the event that the corresponding data line is a trace segment head, and a valid bit 420 for denoting whether the linear address bits 415 are valid.

For the illustrated embodiment, the tag entry 400 further comprises next way bits 425 and previous way bits 430 for facilitating sequential retrieval of the immediate successor trace segment member. More specifically, the next way bits 425 and previous way bits 430 specify the way location of the successor and predecessor data lines. For Is the illustrated embodiment, the tag entry 400 does not include any bits for denoting the set identifications for the successor and predecessor data lines. For the illustrated embodiment, the set identification of the successor and predecessor data lines are always X+1 modulo S and X−1 modulo S, respectively, where X is the set identification of the current data line, and S is number of sets of the data array 200. In an alternate embodiment, additional bits may be employed to specify the set identifications of the successor and predecessor data lines. In other words, the successor and predecessor data lines may be located in any set.

For the illustrated embodiment, the tag entry 400 further comprises next micro-op IP bits (uIP) 435 for identifying the next micro-op IP, next macro-instruction linear IP bits (NLIP) 440 for identifying the next macro-instruction linear IP, and a uIP valid bit 445 for indicating whether the uIP 435 is valid. The uIP 435 is also used as an entry pointer into the microcode sequencer 115 for micro-ops of an encountered complex macro-instruction. The uIP valid bit 445, when set, indicates that instruction caching within the current data line was terminated in response to the encountering of a complex macro instruction. In one embodiment, the NLIP 440 is maintained for a trace segment tail only. In an alternate embodiment, the NLIP 440 is maintained for a trace segment head, a trace segment body, as well as a trace segment tail. Maintaining an NLIP 440 with each trace segment member has the advantage of not having to calculate it in real time, in the event it is needed while accessing the trace segment members, e.g., when the remaining trace segment member is replaced as explained in more detail below.

For the illustrated embodiment, tag entry 400 further comprises ECT pointer bits 447 for identifying information stored in the ECT 230 related to the associated data line, such that the ECT 230 may be updated when a trace segment is overwritten as explained in more detail below.

Figure 4B:
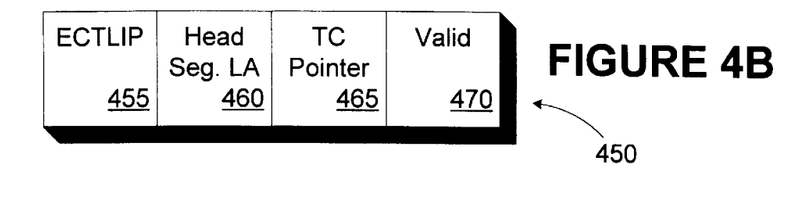

FIG. 4B illustrates in further detail one embodiment of an ECT entry 450 in the entry candidate table 230 in accordance with the present invention. The ECT 230 may be organized as fully associative, set associative, or by a different addressing arrangement known in the art. Methods used to access the ECT 230 based on differing addressing arrangements are known to those of ordinary skill in the art and the invention may be practiced using any of these arrangements. An ECT entry 450 is associated with a selected trace segment identified in the tag array 220. For the illustrated embodiment, the ECT entry 450 includes linear address bits (ECTLIP) 455, head segment bits 460 corresponding to the linear address 415 of the head segment of the trace segment with which the ECT entry 450 is associated, trace cache pointer bits 465 that point to a particular location within the associated trace segment, and a valid bit 470 for indicating that the ECT entry 450 is valid. The trace cache pointer bits 465 include the set number, way number, and uOP offset into the data line corresponding to the entry point in the trace segment. In the illustrated embodiment, the ECTLIP 455 is used as the tag to conduct ECT 230 lookups.

Figure 4C:
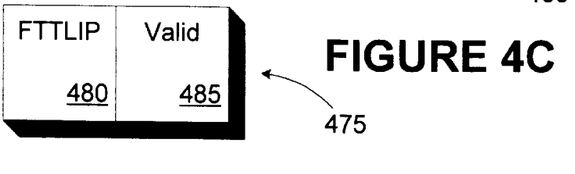

FIG. 4C illustrates in further detail one embodiment of an FTT entry 475 in the future target table 235 in accordance with the present invention. The FTT 235 may be organized as fully associative, set associative, or by a different addressing arrangement known in the art. Methods used to access the FTT 235 based on differing addressing arrangements are known to those of ordinary skill in the art and the invention may be practiced using any of these arrangements. For the illustrated embodiment, the FTT entry 475 includes linear address bits (FTTLIP) 480 for indicating a possible entry point into a trace segment and a valid bit 485 for indicating that the FTT entry 475 is valid.

Each tag entry 400 and ECT entry 450 are constructed when the corresponding data line is built. More specifically, for the cache memory 105 illustrated in FIG. 1, each tag entry 400 and ECT entry 450 are constructed in the fill buffers 250, while the corresponding data line is constructed. The manner in which each tag entry 400 and ECT entry 450 is constructed, and the usage of these fields are described below.

Figure 5:
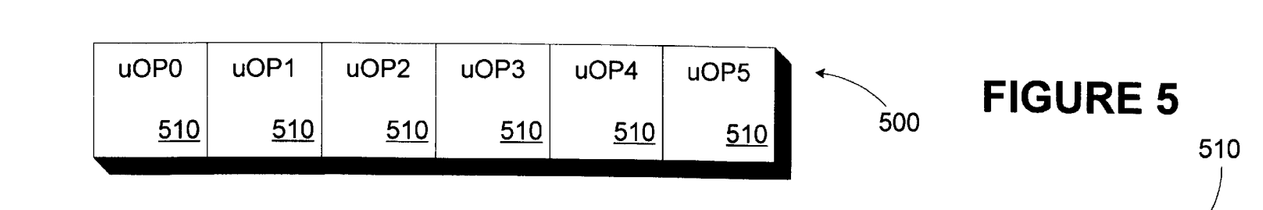
Figure 6:
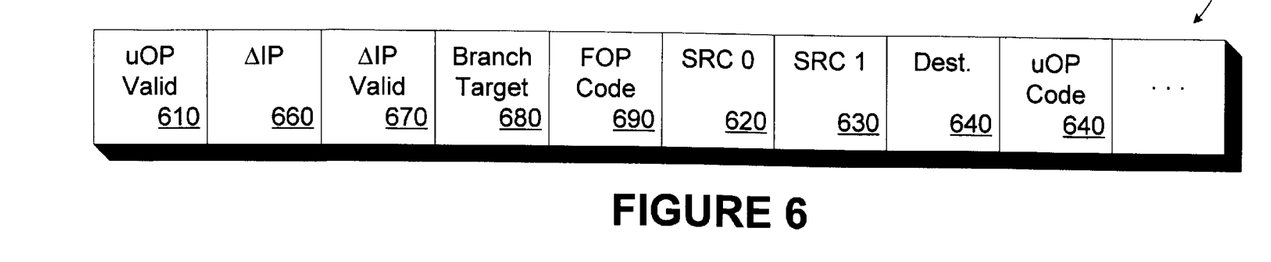

FIGS. 5 and 6 illustrate in further detail one embodiment of a data line in data array 200. As shown, for the illustrated embodiment, each data line 500 comprises six micro-ops (uOPs) 510. As shown in FIG. 6, each uOP 510 comprises a valid bit 610 denoting whether the uOP 510 is valid, source register bits 620, 630, destination register bits 640, and uOP code bits 650. For the illustrated embodiment, each uOP 510 further comprises delta IP bits 660 denoting the delta increment for the macro-instruction IP, delta IP valid bit 670 denoting whether the delta IP bits 660 are valid, branch target bits 680 specifying a branch target address if the uOP 510 is a branch micro-op, and FOP Code bits 690 denoting a floating point opcode if the uOP 510 is a floating point operation. For the illustrated embodiment, the information stored with each uOP 510 may be provided by the decoder 140.

It should be noted that some of the information described as being stored in tag entry 400 may be stored in the corresponding data line 500, and vice versa. It should also be noted that the specific number of bit(s) used for each field can be selected according to various design considerations, and that the numbers specified herein are for ease of understanding of the present invention.

Referring now back to FIG. 2, as described earlier, for the illustrated embodiment, the cache memory 105 includes fill buffers 250. The linear address 415 of a trace segment head (stored in the corresponding tag entry 400) is routed to branch address calculation circuitry of the TBPU 110. Besides the LA 415, the NLIP 440 is routed to the next IP calculation circuitry of the TBPU 110 for calculating the next IP, whose input includes the output of the branch address calculation circuitry. The micro-op IP (uIP) 435 is routed to the microcode sequencer 115 for fetching the remaining uOPs of a complex macro-instruction, and to the multiplexer 120 for selecting between the uOPs output by the data array 200 and the microcode sequencer 115, respectively.

The fill buffers 250 are used to build up the data lines along the predicted execution direction before they are transferred to the tag array 220, the entry candidate table 230 and the data array 200, as the data width of the datapath from an external memory (not shown) to the decoder 140, and therefore from the decoder 140 to the fill buffers 250, is smaller than the size of a data line. For the illustrated embodiment, the fill buffers 250 include multiple buffers to facilitate multiple data lines to be constructed at the same time. The fill buffers 250 collect the address and control information as well as the decoded uOPs that get stored into the tag entries 400 of the tag array 220, the ECT entries 450 of the entry candidate table 230, and corresponding data lines of the data array 200.

Figure 7:
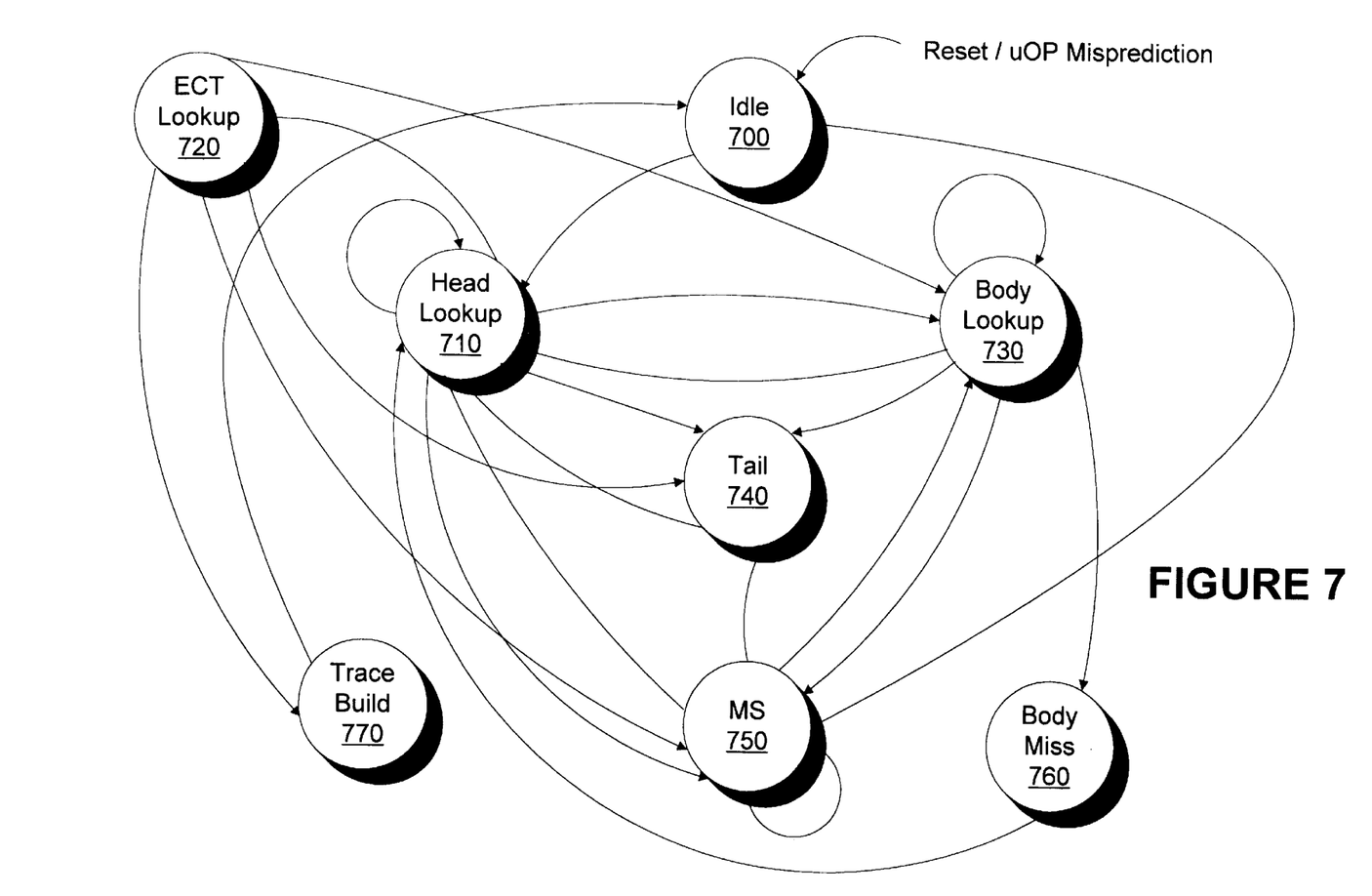
FIG. 7 is a state diagram illustrating the manner in which control logic operates the cache memory of FIG. 2 in an execution mode.
Figure 8:
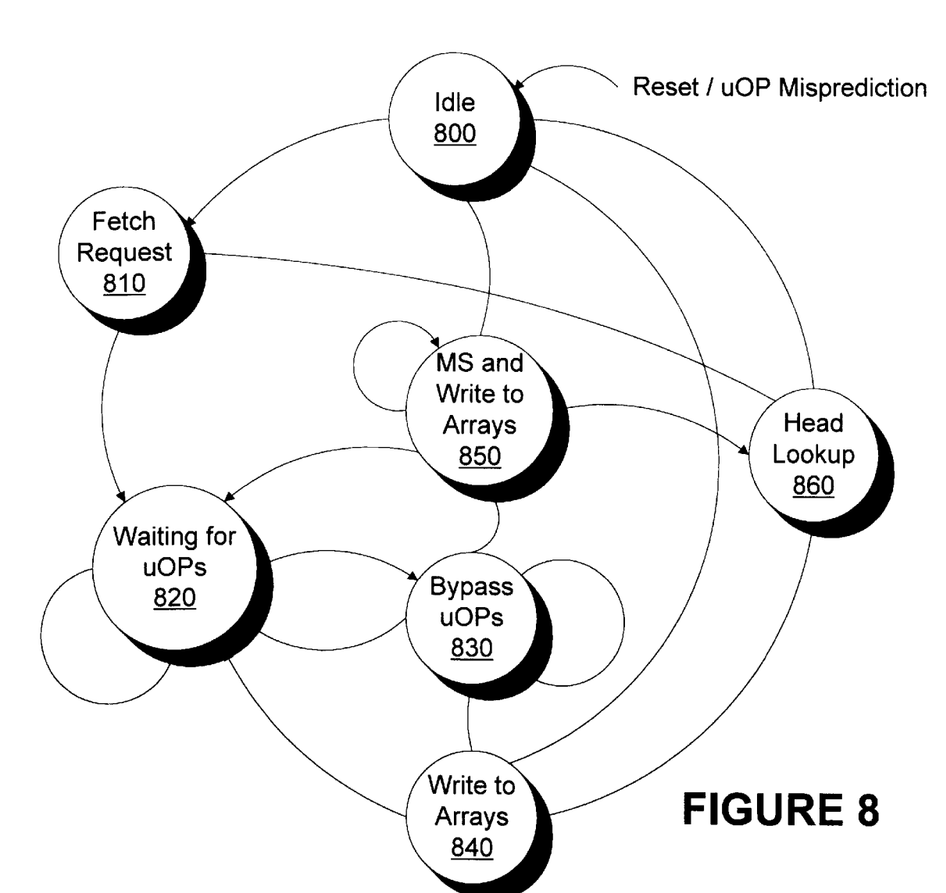
FIG. 8 is a state diagram illustrating the manner in which control logic operates the cache memory of FIG. 2 in a trace segment build mode.

The control logic 210, in addition to controlling the tag array 220, the ECT 230, and the data array 200, also controls the operation of the fill buffers 250. The control logic 210 comprises a plurality of state machines. FIGS. 7 and 8 illustrate the manner in which the control logic 210 operates the embodiment of the cache memory 105 illustrated in FIG. 2. The control logic 210 operates the cache memory 105 basically in one of two complementary modes, an execution mode, which is illustrated in FIG. 7, and a trace segment building mode, which is illustrated in FIG. 8. In one embodiment, the two complementary modes operate exclusive of one another, whereas in another embodiment, with the provision of arbitration circuitry for sharing resources, the two complementary modes may operate concurrently. In one embodiment, the two complementary modes are controlled by two corresponding state machines. It is contemplated that the present invention may be practiced with more or less state machines.

The execution mode state machine shown in FIG. 7 operates in one of eight states, an idle state 700, a head lookup state 710, an ECT lookup state 720, a body lookup state 730, a tail state 740, a micro-sequencer (MS) state 750, a body miss state 760, and a trace build state 770. As shown, the execution mode state machine starts off in the idle state 700, upon reset or upon detection by the execution units 125 of a uOP branch misprediction condition. The execution mode state machine transitions from the idle state 700 to head lookup state 710 when the control logic 210 is informed by the execution units 125 of a macro branch misprediction condition, or it detects either a fetch from a linear address or end of trace segment build condition.

While in the head lookup state 710, the execution mode state machine causes a trace segment head to be looked up by address-matching a next IP, provided by the next IP calculation circuitry of the TBPU 110, against the memory addresses maintained for the trace segment heads. The execution mode state machine will cause the trace segment lookup process to be restarted with a new next IP, if a macro branch misprediction condition is detected by the execution units 125 prior to the completion of the current lookup. If the head lookup process proceeds to the end, the process will result in either a cache hit or cache miss.

If the head lookup process results in a cache hit, and the trace segment head is not also a trace segment tail, and the trace segment head data line did not end with a complex macro-instruction, the execution mode state machine causes the micro-ops of the trace segment head to be output to the execution units 125 and transitions to the body lookup state 730. If the head lookup process results in a cache hit, and the trace segment head is also a trace segment tail, and the trace segment head data line did not end with a complex macro-instruction, the execution mode state machine causes the micro-ops of the trace segment head to be output to the execution units 125 and transitions to the tail state 740.

If the head lookup process results in a cache hit, and the trace segment head data line ends with a complex macro-instruction, the execution mode state machine causes the micro-ops of the trace segment head to be output to the execution units 125 and transitions to the MS state 750. If the lookup process results in a cache miss, the execution mode state machine transitions to the ECT lookup stage 720.

While in the ECT lookup state 720, the execution mode state machine causes a trace segment head to be looked up by address matching the next IP, provided by the next IP calculation circuitry of the TBPU 110, against the ECTLIP 455 addresses maintained for the ECT entries 450. If a matching valid ECT entry 450 is located, the head segment bits 460 are matched to the linear address 415 of the head segment of the trace segment pointed to by the trace cache pointer bits 465.

If the ECT lookup process results in an ECT hit, the execution mode state machine causes the micro-ops of the trace segment member pointed to by the trace cache pointer bits 465 to be output to the execution units 125. It should be noted that the micro-ops to be executed may come from the middle of a trace segment member. Those of ordinary skill in the art will realize that the uIP field 435 can be decoded into a mask to selectively nullify the micro-ops at the beginning of the line that should not be executed from the entry point. The execution mode state machine then transitions to the appropriate body lookup state 730, tail state 740, or MS state 750 as described above in reference to the head lookup state 710. If the ECT lookup process results in an ECT miss, the execution mode state machine transitions to the trace build state 770.

The execution mode state machine will transition to the head lookup state 710 and restart the trace segment lookup process with a new next IP, if a macro branch misprediction condition is detected by the execution units 125, prior to the completion of the current ECT lookup.

While in the body lookup state 730, the execution mode state machine causes the next trace segment body to be looked up. For the illustrated embodiment, as described earlier, the next trace segment body is located in the data line of set X+1 modulo S in way W indexed by next way bits 425 of the current tag entry 400, where X is the current set, S is the number of sets of the data array 200, and W is the indexed way. In an alternate embodiment, the next trace segment body is located in the data line of set Y (denoted by a set identifier bit) in way W indexed by next way bits 425 of the current tag entry 400. Once located, the execution mode state machine causes the uOPs of the trace segment body to be output to the execution units 125. The execution mode state machine remains in the body lookup state 730 and continues to cause the next trace segment bodies to be looked up, and their uOPs to be output, upon locating them, as long as it is getting cache hits, and has not reached the trace segment tail, nor encountered a data line ending with a complex macro-instruction, nor has been informed of a macro/micro branch misprediction condition by one of the execution units 125. For the illustrated embodiment, decoded micro-ops of a macro-instruction may include one or more branch micro-ops.

While in the body lookup state 730, if the control logic 210 is informed of the detection of a macro branch misprediction by one of the execution units 125, the execution mode state machine aborts the body lookup process, and transitions back to the head lookup state 710. If the body lookup process results in a cache hit, and the data line does not end with a complex macro-instruction, but the data line is a trace segment tail, the execution mode state machine transitions to the tail state 740 after the uOPs of the trace segment tail have been output. If the body lookup process results in a cache hit, and the data line ends with a complex macro-instruction, the execution mode state machine transitions to the MS state 750 after the uOPs of the data line have been output. If the body lookup process results in a cache miss, the execution mode state machine transitions to the body miss state 760.

At the tail state 740, the execution mode state machine unconditionally returns to the head lookup state 710. Similarly, at the body miss state 760, the execution mode state machine also unconditionally returns to the head lookup state 710. It is possible to get a cache miss while looking up a trace segment body, because for the illustrated embodiment, the trace segment body may be overwritten by another trace segment, due to the manner in which replacement data line targets are selected (by way prediction, least recently used {LRU}, and the like).

At the MS state 750, the execution mode state machine allows the microcode sequencer 115 to output the remaining uOPs of the data line ending with a complex macro-instruction. The execution mode state machine allows the microcode sequencer 115 to continue until all remaining uOPs have been output, as long as it is not informed of the detection of a macro/micro branch misprediction condition by the execution units 125. The execution mode state machine aborts the allowance if it is informed of the detection of a macro/micro branch misprediction condition by the execution units 125. The execution mode state machine transitions back to the head lookup state 710 if it is informed of the detection of a macro branch misprediction condition. The execution mode state machine transitions back to the idle state 700 if it is informed of the detection of a micro branch misprediction condition.

However, if the control logic 210 is informed by the microcode sequencer 115 that it has finished outputting the remaining uOPs of the data line ending with a complex macro-instruction, the execution mode state machine transitions to the body lookup state 730 if the data line is not a trace segment tail, and to the tail state 740 if the data line is a trace segment tail.

At the trace build state 770, the execution mode state machine unconditionally transitions to the idle state 700 on detection of a trace segment ending condition (denoted by the complementary trace segment build mode state machine) In other words, the trace build state 770 of the execution mode is essentially a wait state.

The trace segment build mode state machine shown in FIG. 8 operates in one of seven states, an idle state 800, a fetch request state 810, a waiting for uOPs state 820, a bypassing uOPs state 830, a write to arrays state 840, a microcode sequencer (MS) and write to arrays state 850, and a head lookup state 860. As shown, the trace segment build mode state machine starts off in the idle state 800, upon reset or upon detection by the execution units 125 of a macro/micro branch misprediction condition. The trace segment build mode state machine transitions from the idle state 800 to the fetch request state 810 when the control logic 210 detects a need to issue an instruction fetch request, i.e., an access to the cache memory 105 results in a tag array and ECT 230 miss.

At the fetch request state 810, the trace segment build mode state machine causes an instruction fetch request to be issued to the ITLB 135, and transitions to the waiting for uOPs state 820. The trace segment build mode state machine remains in the waiting is for uOPs state 820 until valid uOPs are provided to the fill buffers 250. At such time, the trace segment build mode state machine transitions to the bypass uOPs state 830. At the bypass uOPs state 830, the trace segment build mode state machine bypasses the valid uOPs to the execution units 125 as it writes into the fill buffers 250 until a data line terminating condition is encountered. If the data line terminating condition is the encountering of a complex macro-instruction, the trace segment build mode state machine transitions to the MS and write to arrays state 850. For other data line terminating conditions, if the bypassed uOPs built up in the fill buffers 250 are not cacheable, the trace segment build mode state machine returns to the waiting for uOPs state 820. Otherwise, the trace segment build mode state machine transitions to the write to arrays state 840.

As the control logic 210 receives decoded uOPs, it identifies potential ECT entries 450 when control flow instructions, e.g., branch instructions, are encountered by the decoder 140. As stated above, the trace segments are built in the predicted direction. The next LIP of the instruction on the predicted path following the control flow instruction is stored in the ECT 230 as the ECTLIP 455, unless the target address is already contained in the tag array 220 as a head segment LA 415 or was previously stored in the ECT 230. If the potential target address is already contained within the tag array 220 or ECT 230, the trace segment terminating condition has been met and the trace segment build mode state machine transitions to the write to data arrays state 840. Program execution can then continue from the previously identified entry point.

In the illustrated embodiment, the tag array 220 and ECT 230 lookups are conducted after a control flow instruction has been identified to determine if previously identified entry points exist. Because the tag array 220 and ECT 230 are not queried on every uOP, it is conceivable that not all previously identified entry points may be located during the build process, thus resulting in some degree of code redundancy. A tradeoff between port lookup bandwidth and the desire to identify all possible code redundancies exists. In another embodiment of the invention, the tag array 220 and ECT 230 lookups may be conducted for each uOP to minimize code redundancy if the resulting stress on the lookup port bandwidth does not overcome the efficiencies gained from the further reduction in code redundancy.

The trace cache pointer bits 465 are constructed when the data line is written into the data array 200 to point to the position within the trace segment corresponding to the ECTLIP 455. The ECT pointer bits 447 of a tag array entry 400 are also determined to link the data line referenced in the tag array entry 400 to the ECT entries 450 related to the same data line. The actual ECT entry 450 may be constructed in the fill buffers 250 and transferred to the ECT 230 when the data line is written to the tag and data arrays 220, 200.

The position within a trace segment corresponding to the linear target address of the control flow instruction in the predicted direction is known while the trace is being built, because the predicted target address is the next instruction to be included in the trace segment. The linear target address of the control flow instruction in the predicted not-taken direction is also known. However, because the target is on the not-predicted path, it is not immediately entered into the trace segment, and therefore, its corresponding position within a trace segment is not known at the time the control flow instruction is encountered. The tag array 220 and ECT 230 are first queried to identify if the linear target address of the control flow instruction in the predicted not-taken direction has already been identified as an entry point, and if not so identified, the linear target address of control flow instructions in the predicted not-taken direction is stored in the FTT 235 as a potential entry point into a trace segment.

At some later point, the linear address stored in the FTT 235 may be encountered while a trace is being built. Lookups in the FTT 235 are conducted for each uOP to identify potential entry points into the trace segment. If the linear address of a uOP is detected in the FTT 235, a new ECT entry 450 can be allocated as described above to capture the entry point. An example illustrating the use of the FTT 235 is described in greater detail below in reference to FIG. 12.

At the write to arrays state 840, the completed data line is transferred into corresponding locations in the tag and data arrays 220 and 200. Also, any ECT entries 450 corresponding to the data line are transferred to the ECT 230. Recall that for the illustrated embodiment, the locations in data array 200 are the locations of one of the ways of set X+1 modulo S. Recall that for an alternate embodiment, the locations in data array 200 are the locations of one of the ways of an indexed set. In one embodiment, the way is selected by way prediction. Alternatively, an LRU approach may be used. Furthermore, when used in conjunction with the partial address -matching approach for looking up a trace segment head, the LRU approach may be further qualified with the assurance that the tag-matching subsets of the tag addresses for set X+1 module S (or an indexed set) will be unique. In other words, if a non-LRU way has a corresponding tag matching subset of its tag address that is the same as the tag-matching subset of the tag address of the incoming data line, that non-LRU way is selected instead of the LRU way.

Upon writing the data line into the tag and data arrays 220 and 200, and the ECT entries 450 into the ECT 230, the trace segment build mode state machine transitions back to the waiting for uOPs state 820 if the data line that was just written into the data array 200 is not a trace segment tail. If the written data line is a trace segment tail, the trace segment build mode state machine transitions back to the idle state 800 if the NLIP is not known, otherwise, the trace segment build mode state machine transitions to the head lookup state 860.

At the MS and write to arrays state 850, the completed data line is written into the tag and data arrays 220 and 200, and ECT entries 450 are written into the ECT 230 as described earlier for the write to arrays state 840. However, the trace segment build mode state machine does not transition out of the MS and write to arrays state 850 until it has been signaled by the microcode sequencer 115 that the remaining micro-ops of the complex macro-instruction have all been output to the execution units 125. Upon completion of output by the microcode sequencer 115, as in the write to arrays state 840, the trace segment build mode state machine transitions to the waiting for uOPs state 820 if the written data line was not a trace segment tail. If the written data line is a trace segment tail, the trace segment build mode state machine transitions to the idle state 800 if the NLIP is unknown, and to the head lookup state 860 if the NLIP is known.

Additionally, the trace segment build mode state machine will transition to the idle state 800 if the control logic 210 receives notification that a micro branch misprediction has been detected by the execution units 125.

At the head lookup state 860, the trace segment build mode state machine causes the trace segment head to be looked up based on the known NLIP (through the complementary execution mode state machine). The trace segment build mode state machine transitions to the idle state 800 if the lookup resulted in a hit (as informed by the complementary execution mode state machine). Otherwise, the trace segment build mode state machine transitions to the fetch request state 810. From the fetch request state 810, the trace segment build mode state machine transitions to the other states as described earlier.

Figure 9:
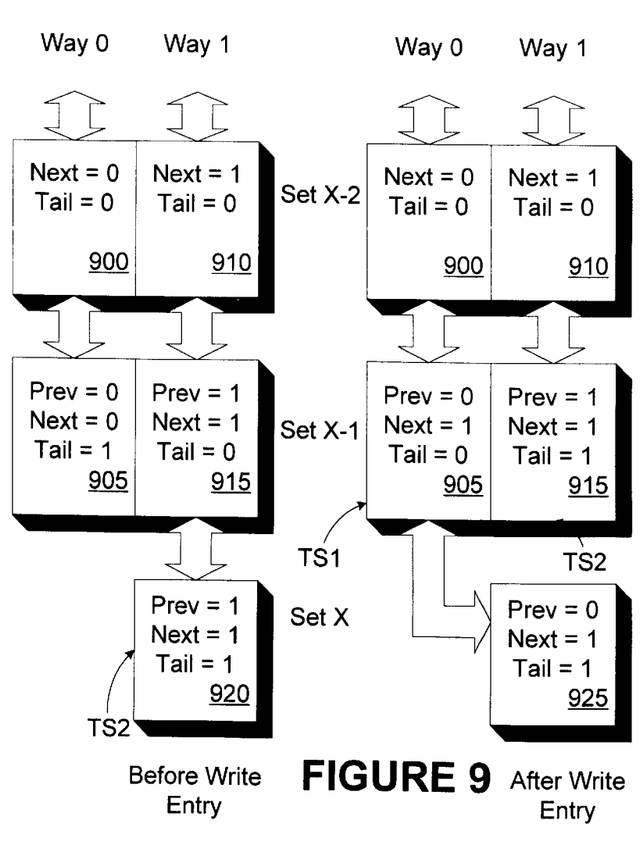
FIG. 9 is a block diagram illustrating how tail maintenance is performed when a line of a trace segment is replaced.

FIG. 9 illustrates the tail maintenance, and the overwriting scenario in further detail. Shown are two exemplary trace segments, TS1 and TS2. For ease of explanation, TS1 includes a trace segment body 900 and a trace segment tail 905, stored in set X−2 modulo S, way 0 and set X−1 modulo S, way 0, respectively, whereas TS2 includes trace segment bodies 910 and 915, and a trace segment tail 920, stored in set X−2 modulo S, way 1, set X−1 modulo S, way 1, and set X, way 1, respectively. Set X, way 1 was selected to store a new trace segment tail 925 for TS1. To properly associate set X, way 1 to TS1, the previous way field of set X, way 1 is modified to index to way 0, as shown. The tail information of set X, way 1 was already set, thus no change is needed. Had set X, way 1 not been previously used to store a trace segment tail, the tail information would be set.

In addition, to properly establishing the data line of set X, way 1 as the trace segment tail of TS1, the next way field, and tail information of TS1's previous tail 905 stored in set X−1 modulo S, way 0 have to be updated. As shown, the next way field for set X−1 modulo S, way 0 is updated to index way 1, and the tail information is cleared. Furthermore, the control information for TS2 has to be updated. As shown, the immediate predecessor to the overwritten trace segment tail 920, that is, the prior trace segment body 915 of TS2 is converted into a trace segment tail 915 for TS2 instead. This is accomplished by setting the tail bit for set X−1 modulo S, way 1. The trace segment member 915 may be flagged as a tail immediately when the previous trace segment tail 920 is overwritten. Alternatively, the trace segment member 915 may be flagged as a tail in the body miss state 760 the next time the trace segment TS2 is executed. If the tail information had not been updated immediately, a body miss would occur in the body lookup state 730.

If an ECT entry 450 had been associated with the overwritten trace segment tail 920, the ECT pointer bits 447 of the tag array entry 400 would be used to access the ECT 230 and invalidate the ECT entry 450. The ECT pointer bits 447 are used to access the ECT 230 and invalidate the ECT entry 450 for any trace segment members replaced, including head members 261, body members 262, and tail members 263.

Figure 10:
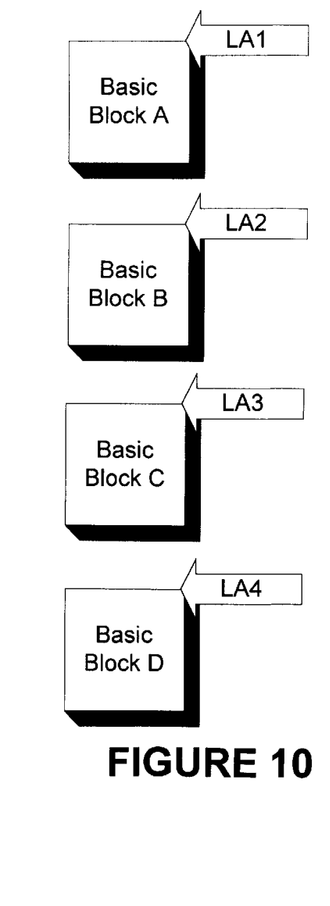
FIG. 10 illustrates basic blocks of an executing program suitable for storing in the cache memory of FIG. 2.
Figure 11:
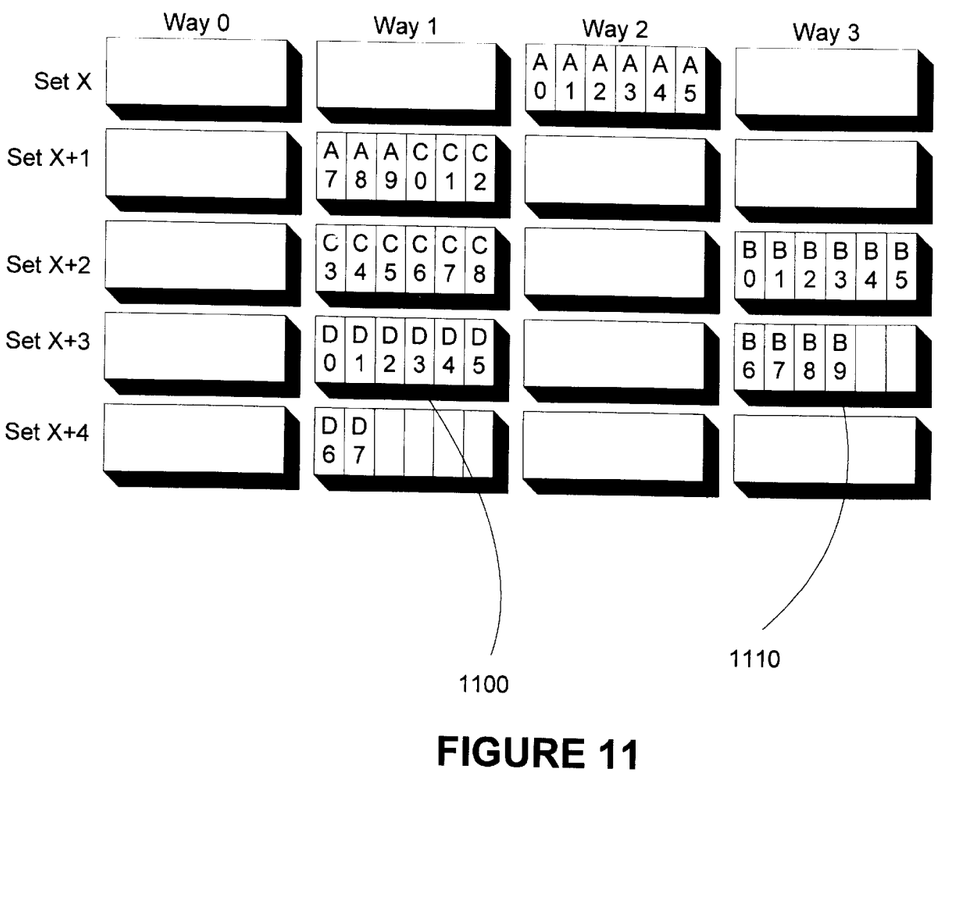
FIG. 11 illustrates how the basic blocks of FIG. 10 are stored in the cache memory in trace segments having multiple entry points.
Figure 12:
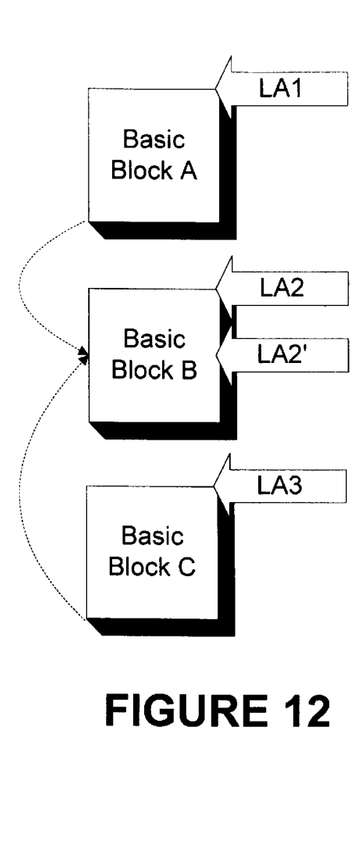
FIG. 12 illustrates how the future target table of FIG. 2 may be used to identify further entry points into a trace segment.

An example illustrating the advantages of having multiple entry points into a trace segment is illustrated in FIGS. 10–12. Basic blocks A, B, C, and D represent code segments of an executing program. The linear addresses of basic blocks A, B, C, and D are represented by LA1, LA2, LA3, and LA4 respectively. The end instruction in basic block A is a control flow instruction, e.g., a conditional branch, that is predicted taken. The target address of the branch is LA3 corresponding to the first instruction of basic block C. Basic block D is executed after basic block C. Accordingly, a trace segment 1100 containing blocks A, C, and D is built by the trace segment build mode state machine in the arrangement shown in FIG. 11. The head segment linear address 415 in the tag array entries 400 corresponding to the trace segment 1100 is LA1.

Basic block A includes 6 uOPs in set X, way 2, and 3 uOPs in set X+1, way 1. Basic block C begins in set X+1, way 1 in the uOP3 position and continues into the next data line (set X+2, way 1). Basic Block D completes the trace segment in set X+3, way 1 and set X+4, way 1.

During the fetch request stage 810 of the build process of FIG. 8, the control flow instruction at the end of basic block A is identified. An entry will be allocated in the ECT 230 corresponding to the predicted path of the control flow instruction, i.e., to the start of basic block C. The ECT entry 450 includes LA3 as the ECTLIP 455 and LA1 as the head segment bits 460. The TC pointer bits 465 correspond to set X+1, way 1, and a uOP offset pointing to uOP3.

Assume basic block B has not been previously executed. The cache memory 105 receives a request for linear address LA2 (basic block B). In the execution mode of FIG. 7, neither the head lookup stage 710 nor the ECT lookup stage 720 will identify an entry LA2, resulting in a cache miss. The cache memory 105 will switch to build mode and enter the fetch request stage 810. As a new trace segment 1110 is built from the uOPs of basic block B, the tag array entries 400 corresponding to the new trace segment 1110 will have a head segment linear address 415 of LA2. During the build process, LA3 will be encountered as basic block C is predicted to be executed after basic block B. The ECT 230 will be queried with LA3 and an ECT hit will occur. The ECT hit is a trace segment terminating condition, and the new trace segment 1110 will be terminated and written to the data array 200 as shown in FIG. 11.

The cache memory 105 will then switch to the execution mode and identify the entry point into the trace segment 1100 at LA3 during the ECT lookup stage 720. The cache memory 105 will begin sending the uOPs of basic block C from set X+1, way 1, and uOP3 as described above.

FIG. 12 illustrates an example where the future target table 235 is used to identify a potential entry point into a trace segment. As with the previous example, basic block A ends with a control flow instruction, e.g., a conditional branch. In this example, the branch is predicted not-taken. Accordingly, the predicted taken direction of the branch is LA2, and therefore, LA2 is identified as an entry point and is allocated into the ECT 230 (assuming LA2 was not previously allocated in the tag array 220 or ECT 230). A trace segment is built containing basic blocks A and B. Assume the target of the branch at the end of basic block A, if it were to be taken, is within basic block B (i.e., LA2'). This address would be ignored by the ECT 230 because it is not on the taken path. The not-taken target of the branch is stored in the future target table 235. An FFT entry 475, having an FTTLIP 480 of LA2' is allocated.

As the trace segment containing basic blocks A and B is built, the instruction within basic block B at LA2' is encountered. A lookup in the FTT 235 will generate a hit indicating that an entry point candidate identified in the FTT 235 has been reached. Assuming LA2' was not previously allocated in the tag array 220 as a head LIP 415 or in the ECT 230, a new ECT entry 450 including the position of LA2' within the trace segment is allocated, and the corresponding FTT entry 475 is deallocated.

At some later time, a different trace segment is built from basic block C. Basic block C contains a control flow instruction that directs program execution to the point in basic block B corresponding to the linear address LA2'. Because LA2' had been identified as a potential entry point, and later allocated into the ECT 230, the trace segment containing basic block C can be terminated and program execution can continue from within the previous trace segment containing LA2'.

Although the invention has been described with the tag array 220 tracking segment head information and the entry candidate table 230 tracking entry points within a trace segment, it is contemplated that, with some modification, one of ordinary skill in the art could develop a single array adapted to track all entry points into a trace segment in view of this specification.

Thus, advantages of having multiple entry points into a trace segment have been illustrated. By identifying multiple entry points into a trace segment, a new trace segment can be terminated without introducing code redundancy into the cache memory 105, and execution can continue from the previously cached uOPs. The use of multiple entry points improves cache hit rate, and resultingly, processor performance.

While the invention is susceptible to various modifications and alternative forms, specific embodiments have been shown by way of example in the drawings and have been described in detail herein. However, it should be understood that the invention is not intended to be limited to the particular forms disclosed. It will be appreciated by those of ordinary skill having the benefit of this disclosure that numerous variations from the foregoing illustrations will be possible without departing from the inventive concept described herein. Accordingly, it is the claims set forth below, and not merely the foregoing illustration, which are intended to define the exclusive rights claimed in this application.

What is claimed is:

1. An apparatus comprising:
  a data array;
  control logic coupled to the data array and adapted to store at least one trace segment of instructions into the data array;
  an entry candidate table coupled to the control logic and adapted to store offset information related to the position of a selected instruction within the trace segment; and
  a future target table coupled to the control logic and adapted to store a potential entry point into the trace segment.

2. The apparatus of claim 1, wherein the control logic operates to terminate storing of instructions as members of a current trace segment in accordance with a plurality of predetermined trace segment terminating conditions, and the trace segment terminating conditions including encountering an entry in the entry candidate table corresponding to the instruction being stored.

3. The apparatus of claim 1, wherein the potential entry point corresponds to a predicted not-taken target address of a control flow instruction.

4. The apparatus of claim 1, wherein the control logic is further adapted to sequentially retrieve the instructions of the trace segment beginning with a selected instruction, the selected instruction being offset from the first instruction of the trace segment.

5. The apparatus of claim 1, wherein the selected instruction corresponds to a predicted target address of a control flow instruction.

6. The apparatus of claim 5, wherein the control flow instruction is stored in the trace segment in a position immediately before the selected instruction.

7. The apparatus of claim 1, wherein the control logic is further adapted to identify an entry point instruction in the trace segment corresponding to a potential entry point stored in the future target table.

8. The apparatus of claim 7, wherein the control logic is further adapted to allocate an entry in the entry candidate table corresponding to the position of the entry point instruction within the trace segment.

9. The apparatus of claim 1, wherein the trace segment includes a plurality of trace segment members of one or more instructions, and the offset information identifies the trace segment member containing the selected instruction.

10. The apparatus of claim 9, wherein the offset information includes an instruction offset indicating the position of the selected instruction within the trace segment member.

11. The apparatus of claim 9, wherein the data array includes a plurality of data lines, one trace segment member is stored per data line, and the offset information includes the line number of the trace segment member containing the selected instruction.

12. The apparatus of claim 9, wherein the data array includes a plurality of data lines organized into N ways of S sets, and the offset information includes the set number and way number of the trace segment member containing the selected instruction.

13. The apparatus of claim 12, wherein the offset information includes an instruction offset indicating the position of the selected instruction within the trace segment member.

14. A method for caching instructions, comprising:
  storing a first plurality of instructions in a first trace segment;
  identifying a control flow instruction from the first plurality of instructions;
  predicting an outcome of the control flow instruction, the control flow instruction having a predicted taken target address and a predicted not-taken target address corresponding to the outcome predicted; and storing the predicted not-taken target address in a future target table.

15. The method of claim 14, further comprising:
  storing a second plurality of instructions in a second trace segment;
  identifying a selected instruction from the second plurality of instructions corresponding to the predicted not-taken target address; and
  storing offset information related to the position of the selected instruction within the second trace segment.

16. The method of claim 14, further comprising:
  identifying a selected instruction from the first plurality of instructions corresponding to the predicted not-taken target address; and storing offset information related to the position of the selected instruction within the first trace segment.

17. The method of claim 16, the first trace segment including a plurality of trace segment members of one or more instructions, wherein the storing offset information includes storing offset information identifying the trace segment member containing the selected instruction.

18. The method of claim 16, the method further comprising:
storing the first trace segment in a data array, the data array including a plurality of data lines, wherein the offset information includes the line number of the of the trace segment member containing the selected instruction.

19. The method of claim 16, wherein the storing offset information includes storing an instruction offset indicating the position of the selected instruction within the trace segment member.

20. The method of claim 16, the method further comprising:
storing the first trace segment in a data array, the data array including a plurality of data lines organized into N ways of S sets, wherein the offset information includes the set number and way number of the trace segment member containing the selected instruction.

21. The method of claim 20, wherein the storing offset information includes storing an instruction offset indicating the position of the selected instruction within the trace segment member.

22. A method for caching instructions comprising:
storing a first plurality of instructions in a first trace segment;
identifying a control flow instruction from the first plurality of instructions;
predicting an outcome of the control flow instruction, the control flow instruction having a predicted taken target address and a predicted not-taken target address corresponding to the outcome predicted;
identifying a selected instruction from the first plurality of instructions corresponding to the predicted not-taken target address;
storing a second plurality of instructions in a second trace segment; and
terminating the storing of the second plurality of instructions in accordance with a plurality of predetermined trace segment terminating conditions, the trace segment terminating conditions including encountering an instruction from the second plurality of instructions corresponding to the selected instruction.

23. A microprocessor, comprising:
a cache memory adapted to store a plurality of trace segments, each trace segment including a first plurality of instructions and having a head instruction; and
an entry candidate table adapted to store a plurality of entry points, each entry point corresponding to a position within a selected trace segment offset from the head instruction; and
a future target table adapted to store a potential entry point into one of the trace segments.

24. The microprocessor of claim 23, further comprising:
an execution unit coupled to the cache memory adapted to execute instructions;
a branch prediction unit adapted to receive a second plurality of instructions and predict the instructions of the second plurality required for execution by the execution unit.

25. The microprocessor of claim 24, further comprising:
control logic coupled to the cache memory and adapted to build the trace segments by selecting instructions from the second plurality based on predictions from the branch execution unit.

26. The microprocessor of claim 25, wherein the control logic comprises a state machine.

27. The microprocessor of claim 25, wherein the control logic is adapted to identify a control flow instruction among the second plurality of instructions, the branch prediction unit is adapted to predict an outcome of the control flow instruction, the control flow instruction having a predicted taken target address and a predicted not-taken address corresponding to the outcome predicted, and the control logic is adapted to store the predicted not-taken address as a potential entry point in the future target table.

28. The microprocessor of claim 25, wherein the control logic is adapted to identify a selected instruction among the second plurality of instructions corresponding to the potential entry point in the future target table and store an entry point in the entry candidate table corresponding to the position of the selected instruction with an associated trace segment.

29. A microprocessor system, comprising:
a main memory adapted to store a first plurality of instructions, each instruction being indexed by a linear address; and
a microprocessor, the microprocessor comprising:
an execution engine adapted to execute instructions;
a branch prediction unit adapted to predict the instructions from the first
plurality required for execution by the execution unit;
a cache memory adapted to store a plurality of trace segments, each trace segment comprising a second plurality of instructions and having a head address corresponding to one of the linear addresses in the main memory; and
an entry candidate table adapted to store a plurality of entry points, each entry point corresponding to a position within a selected trace segment offset from the first instruction of the trace segment;
a future target table adapted to store a plurality of potential entry points, each potential entry point corresponding to one of the linear addresses in the main memory; and
build control logic adapted to build trace segments in the cache memory from the first plurality of instructions, wherein the order of the instructions in a selected trace segment is based on the predictions from the branch prediction unit; and the build control logic is further adapted to:
identify a control flow instruction among the first plurality of instructions, the control flow instruction having a predicted taken target address and a predicted not-taken target address corresponding to an outcome predicted by the branch prediction unit;
store the predicted not-taken target address as a potential entry point in the future target table; and
store the predicted taken target address and position with the selected trace segment as an entry point in the entry candidate table.

* * * * *

UNITED STATES PATENT AND TRADEMARK OFFICE
CERTIFICATE OF CORRECTION

PATENT NO. : 6,076,144
DATED : June 13, 2000
INVENTOR(S) : Peled et al.

It is certified that error appears in the above-identified patent and that said Letters Patent is hereby corrected as shown below:

Column 1,
Line 42, delete "modem" and insert -- modern --.

Column 9,
Line 29, delete "address matching" and insert -- address-matching --.

Column 11,
Line 19, delete "waiting is for" and insert -- waiting for --.

Column 12,
Line 49, delete "tag matching" and insert -- tag-matching --.

Signed and Sealed this

Sixth Day of June, 2006

JON W. DUDAS
*Director of the United States Patent and Trademark Office*